United States Patent
Bungo et al.

(10) Patent No.: US 7,696,445 B2
(45) Date of Patent: Apr. 13, 2010

(54) OIL LEVEL DETECTING SWITCH

(75) Inventors: Keiichiro Bungo, Wako (JP); Kazutomo Nishida, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/424,108

(22) Filed: Apr. 15, 2009

(65) Prior Publication Data

US 2009/0294269 A1    Dec. 3, 2009

(30) Foreign Application Priority Data

Jun. 3, 2008    (JP)    ............... P2008-145888

(51) Int. Cl.
*H01H 35/18*    (2006.01)
(52) U.S. Cl. .................................... 200/84 R
(58) Field of Classification Search ...... 200/84 R–84 C; 73/308, 322.05, 305, 309, 313; 340/450.3, 340/623, 693; 60/535, 585, 534, 592
See application file for complete search history.

(56) References Cited

U.S. PATENT DOCUMENTS

| | | | | |
|---|---|---|---|---|
| 1,768,446 A | * | 6/1930 | Gron | ........................ 200/84 R |
| 1,813,382 A | * | 7/1931 | Chappell | .................. 340/450.3 |
| 2,661,411 A | * | 12/1953 | Berger | ....................... 200/84 R |
| 3,008,420 A | | 11/1961 | Davis | |
| 3,409,750 A | * | 11/1968 | Hathaway | .................. 200/84 R |
| 4,308,725 A | * | 1/1982 | Chiyoda | ....................... 62/129 |
| 4,386,337 A | | 5/1983 | Todd | |
| 4,473,730 A | * | 9/1984 | Ida | ........................... 200/84 R |
| 4,630,443 A | * | 12/1986 | Steer | ............................ 60/535 |
| 4,736,077 A | * | 4/1988 | Valente | ..................... 200/84 C |
| 5,026,954 A | * | 6/1991 | Cebulski | ................... 200/84 C |
| 5,872,509 A | * | 2/1999 | Kim | ........................ 340/450.3 |
| 7,484,409 B2 | * | 2/2009 | Dykstra et al. | ................ 73/319 |

FOREIGN PATENT DOCUMENTS

GB    232 661 A    4/1925
JP    62-133132 U    8/1987

* cited by examiner

*Primary Examiner*—Michael A Friedhofer
(74) *Attorney, Agent, or Firm*—Arent Fox LLP

(57) ABSTRACT

Oil level detecting switch, which detects an amount of lubricant oil stored in an oil pan, includes: a switch case having through-holes to permit entry and discharge of oil into and out of the switch case; a float of a spherical shape having smaller specific gravity than the oil and conductive outer surface and provided within the switch case for vertical movement in response to increase/decrease of the oil; and a plurality of fixed contacts provided on the bottom surface of the switch case such that the fixed contacts are placed in a conducting state by the float contacting the fixed contacts.

2 Claims, 3 Drawing Sheets

OIL LEVEL DETECTING SWITCH

FIELD OF THE INVENTION

The present invention relates to an improvement of oil level detecting switches provided in general-purpose engines for detecting a level of lubricant oil.

BACKGROUND OF THE INVENTION

Among the conventionally-known oil level detecting switches or oil level detectors are ones in which a float moves up or down, in response to variation of an oil level, while being guided by a guide rod (see, for example, Japanese Utility Model Laid-Open Publication No. SHO-62-133132 that will hereinafter be referred to as "Patent Literature 1"), and ones in which a movable contact is provided at the lower end of a float and in which, as the float descends, the movable contact contacts and electrically connects to the two fixed contacts (see, for example, Japanese Utility Model Laid-Open Publication No. HEI-5-14507 that will hereinafter be referred to as "Patent Literature 2").

According to the disclosure of Patent Literature 1, a wave preventing case is provided in a crankcase, a bottom plate is mounted on a lower portion of the wave preventing case, a guide rod extends upwardly from the bottom plate within the wave preventing case, and a float is fitted in the guide rod in such a manner that it is movable up and down. Proximity switch for detecting a position of the float is incorporated in the guide rod. However, because the guide rod is located centrally in the oil level detector as viewed in plan and extends through the float, the oil level detector would have to be increased in overall size as the outer diameter of the guide rod is increased. Further, because the guide rod and the float are constantly kept in sliding contact with each other, the guide rod and the float are subject to abrasion due to abrasion power in the oil etc., and the abrasion would become even greater due to vibration of the engine. As a consequence, it would become difficult for the float to move up and down, which thereby increases a possibility of malfunction where the float fails to properly follow variation in the oil level.

According to the disclosure of Patent Literature 2, an additional case is mounted in a crankcase, a shaft is provided in such a manner that it extends through upper and lower walls of the additional case and is movable up and down relative to the additional case, the float is provided within the case 20 and threaded over the shaft, the movable contact is provided on the lower surface of the float, and the fixed contacts are provided on a bottom wall of the additional case so as to contact the movable contact as the float descends. Further, an electrically conductive ring is provided on the upper surface of the additional case, and a clip is provided on the upper surface of the float. Thus, the oil level detecting switch disclosed in Patent Literature 2 has a great number of necessary component parts. Therefore, there is a need to reduce the number of necessary component parts from the viewpoint of cost. Further, when an insulating substance, such as dust mixed in the oil, is sandwiched between the movable contact and the fixed contacts, electrical connection between the movable contact and the fixed contacts is prevented, which prevents appropriate oil level detection.

SUMMARY OF THE INVENTION

In view of the foregoing prior art problems, it is an object of the present invention to provide an improved oil level detecting switch which can be reliably prevented from malfunctioning and can be constructed in a small size and at reduced cost.

In order to accomplish the above-mentioned object, the present invention provides an improved oil level detecting switch for detecting an amount of lubricant oil stored in an oil storing chamber provided in a lower interior portion of a crankcase of an engine, which comprises: a switch case having a through-hole to permit entry and discharge of oil into and out of the switch case; a float of a spherical shape having smaller specific gravity than the oil and having an electrically conductive outer surface and provided within the switch case for upward or downward movement in response to increase or decrease in the stored amount of the oil (i.e, level of the oil); and a plurality of fixed contacts provided on the bottom surface of the switch case in such a manner that the fixed contacts are placed in an electrically conducting state by the float contacting the fixed contacts.

Because it is only necessary that the spherical float be provided within the switch case, the oil level detecting switch of the present invention can eliminate a need for a heretofore-required guide member that guides the float, and thus, the oil level detecting switch of the invention can be reduced in size as viewed in plan and reduced in the total number of necessary component parts. Therefore, the oil level detecting switch of the invention can be attached to the engine with an increased ease.

Further, because the float only has to be movable vertically (i.e., up and down) in response to variation of the oil level (i.e., increase/decrease in the stored amount of the oil), there is no sliding contact between the float and a guide member in the present invention, and thus, movement of the float is never impeded or adversely influenced by abrasion of sliding sections. More specifically, even when the engine is in an inclined position, the present invention can avoid the prior art problem that the float and hence the oil level detecting switch malfunctions by the load of the float acting on the guide to increase the frictional force between the guide and the float.

Furthermore, the present invention can of course avoid the prior art problem that uneven abrasion is caused in the guide due to vibration and long-time use of the engine so that it becomes difficult for the float to move and thus the oil level detecting switch tends to malfunction. Because there is no undesired catching engagement between the float and the float guide as encountered in the prior art, the reliability of the oil level detecting switch of the present invention can be significantly improved.

Furthermore, because the oil level detecting switch of the present invention requires no guide member and the float is constructed to function also as a movable contact, the present invention can significantly reduce the numbers of necessary component parts and assembly steps and thereby reduce necessary cost.

Preferably, each of the fixed contacts comprises a pair of electrically interconnected fixed contact members, and the respective pairs can be placed in an electrically conducting state via the float. Thus, even when some electrically insulating substance, such as dust, is present between the float and one of the contact members of one of the fixed contacts, the float and the other contact member of the one fixed contact can electrically connect with each other, so that there can be achieved reliable electrical connection between the fixed contacts. As a result, the oil level detecting switch can reliably detect the oil level; thus, the reliability of the oil level detecting of the present invention switch can be enhanced.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
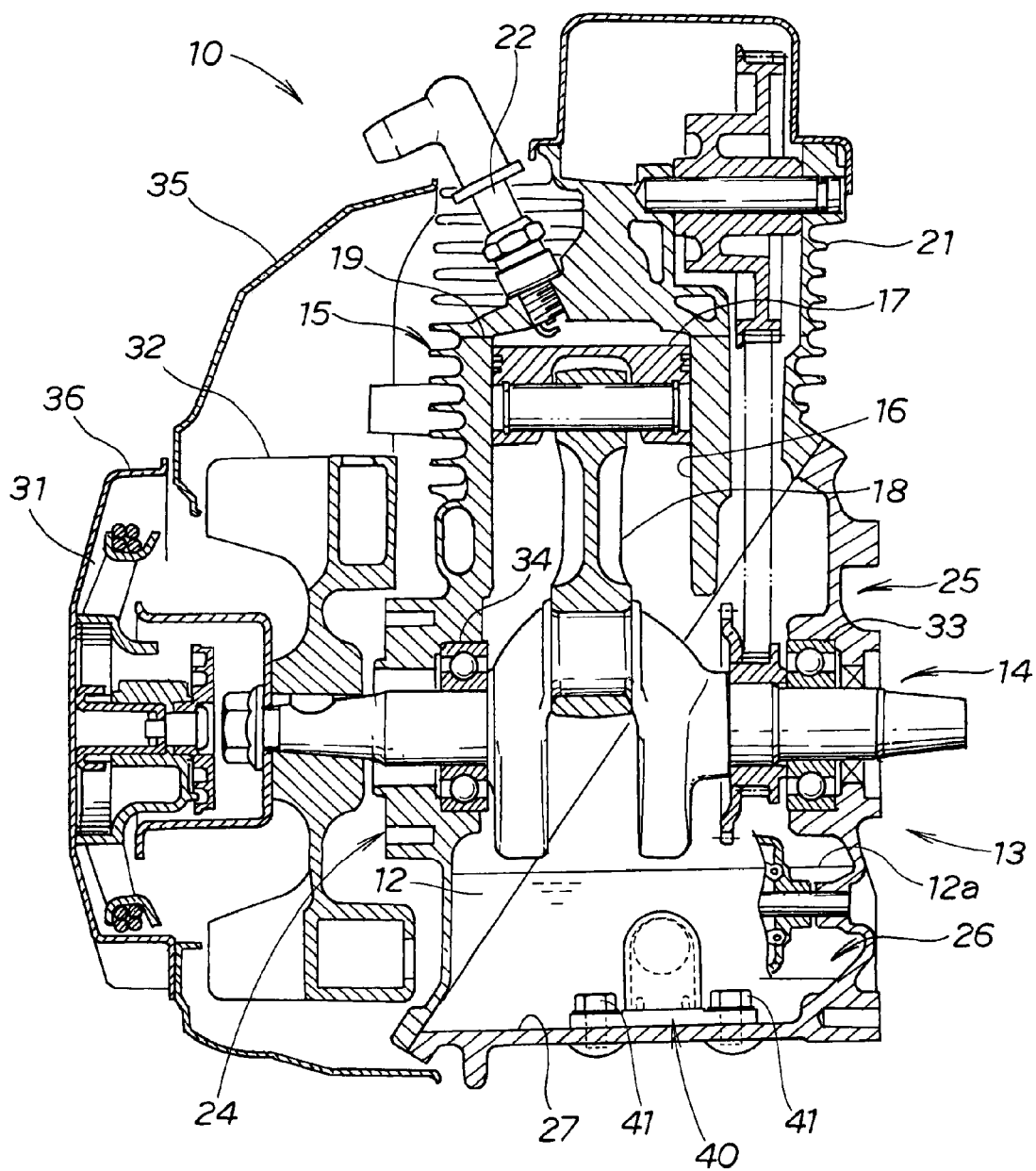
FIG. 1 is a sectional view of an engine provided with an oil level detecting switch according to the present invention.

Reference is now made to FIG. 1 showing in section an engine 10 provided with an oil level detecting switch 40 according to the present invention. The engine 10 is a single-cylinder, air-cooling type engine which includes: a crankcase 13 having lubricant oil 12 stored therein; a crankshaft 14 rotatably mounted in the crankcase 13 via bearings 33 and 34 and extending in a horizontal direction; a cylinder block 15 integrally formed with an upper portion of the crankcase 13; a piston 17 vertically movably inserted in a cylinder bore 16 of the cylinder block 15; a connecting rod 18 interconnecting the piston 17 and the crankshaft 14; a cylinder head 21 fixedly mounted on the upper surface 19 of the cylinder block 15; an ignition plug 22 fixedly mounted on an upper portion of the cylinder head 21; and a valve operating mechanism (not shown) provided on the cylinder head 21.

The crankcase 13 comprises a first crankcase member 24 provided adjacent to the cylinder block 15, and a second crankcase member 25 provided adjacent to an oil pan 26 storing the lubricant oil 12. The first and second crankcase members 24 and 25 are secured together along their respective slanting surfaces.

Motive energy is taken out from one end of the crankshaft 14, and a recoil starter 31 and cooling fan 32 are connected to the other end of the crankshaft 14.

Reference numeral 35 in the figure indicates an engine cover, and 36 a recoil starter cover. The oil level detecting switch 40 for detecting an amount of the oil 12 is mounted on a bottom portion of the crankcase 25 by means of bolts 41.

Figure 2:
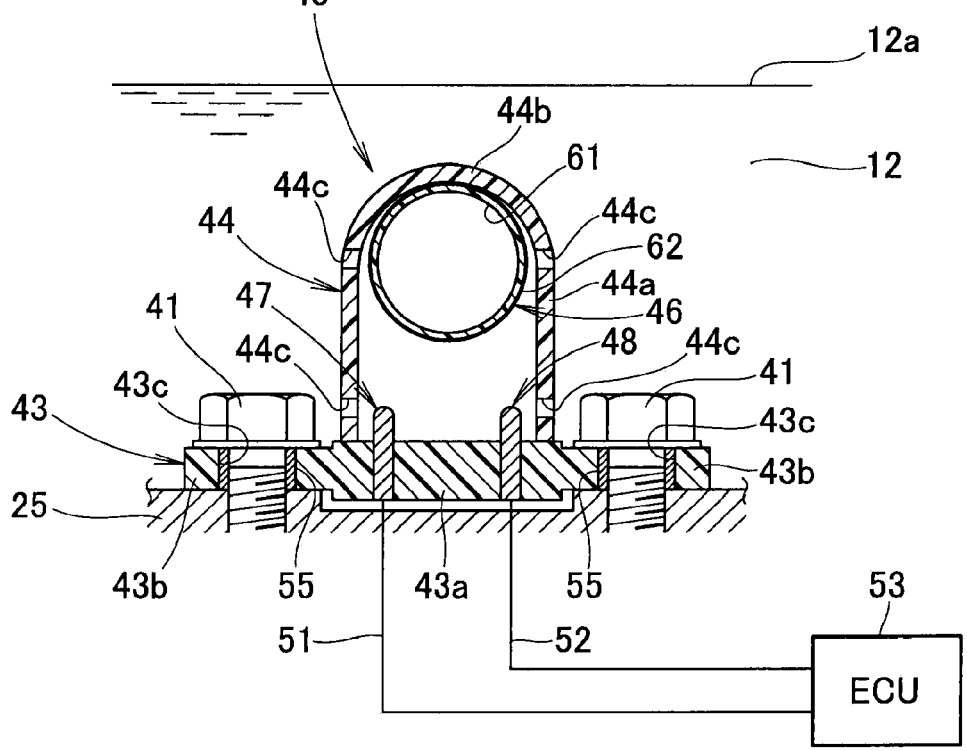
FIG. 2 is a sectional view of the oil level detecting switch of the present invention.

FIG. 2 is a sectional view of the oil level detecting switch 40 of the present invention. The oil level detecting switch 40 comprises a resin-made base member 43, a resin-made switch case 44 mounted on the upper surface of the base member 43, a spherical float 46 accommodated in the switch case 44, and fixed contacts 47 and 48 secured to the base member 43 to project upwardly from the upper surface of the base member 43. The fixed contacts 47 and 48 are connected to an ECU (Electronic Control Unit) 53 via respective electric leads 51 and 52. Reference numeral 12a indicates a level of the oil.

The base member 42 includes a circular base 43a, and flanges 43b formed integrally with opposite sides of the circular base 43a. Through-hole 43c is formed in each of the flanges 43b, and a metal collar 55 is mounted in each of the through-holes 43c. The bolts 41 are threaded through the collars 55, so that the base member 43 is secured to the bottom portion of the second crankcase member 25 by means of the bolts 41.

The switch case 44 includes a cylindrical section 44a mounted on the base member 43, and a semi-spherical dome section 44b formed integrally with an upper portion of the cylindrical section 44a. The switch case 44 has a plurality of through-holes 44c formed therein to permit entry and discharge of the oil 12 into and out of the case 44, i.e. in such a manner that the oil 12 and air flows therethrough from outside to inside and from outside to inside of the switch case 44.

The float 46 includes a resin-made spherical float body 61 having smaller specific gravity than the oil 12, and an electrically conductive outer film 62 formed on the outer surface of the float body 61. The outer film 62 functions as a movable contact that is electrically connectable to the fixed contacts 47 and 48 (to place the fixed contacts 47 and 48 in an electrically conducting state) once it descends into contact with the fixed contacts 47 and 48 as the amount of the oil 12 decreases. Preferably, the outer film 62 is formed of copper or aluminum by plating, painting, thermal spraying or vapor deposition.

Upon receipt of a signal generated in response to the fixed contacts 47 and 48 being placed in the electrically conductive state as noted above, the ECU 53 determines that the amount of the oil 12 has decreased below a predetermined lower limit level, and causes an alarm device to issue an alarm and compulsorily deactivates the operating engine by breaking an ignition signal or otherwise.

Figure 3:
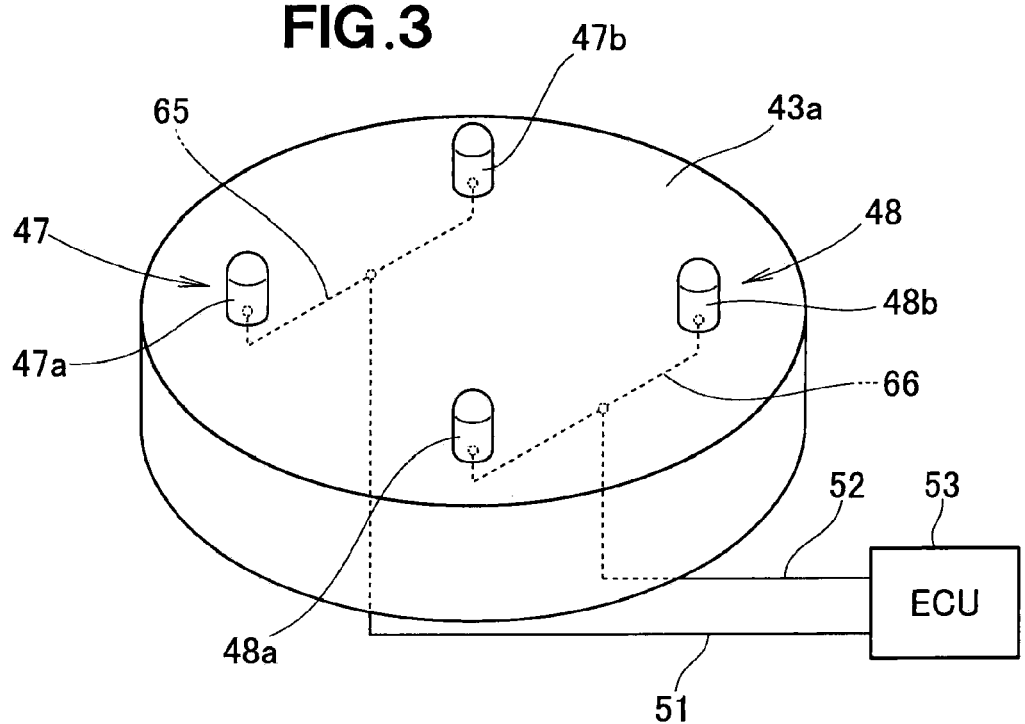
FIG. 3 is a perspective view explanatory of fixed contacts employed in the oil level detecting switch of the present invention.

FIG. 3 is a perspective view explanatory of the fixed contacts 47 and 48 fixed a base body 43a of the base member 43. The fixed contact 47 comprises a pair of contact members 47a and 47b interconnected via a lead 65 connected to the lead 51. Similarly, the fixed contact 48 comprises a pair of contact members 48a and 48b interconnected via a lead 66 connected to the lead 52.

Figure 4A:
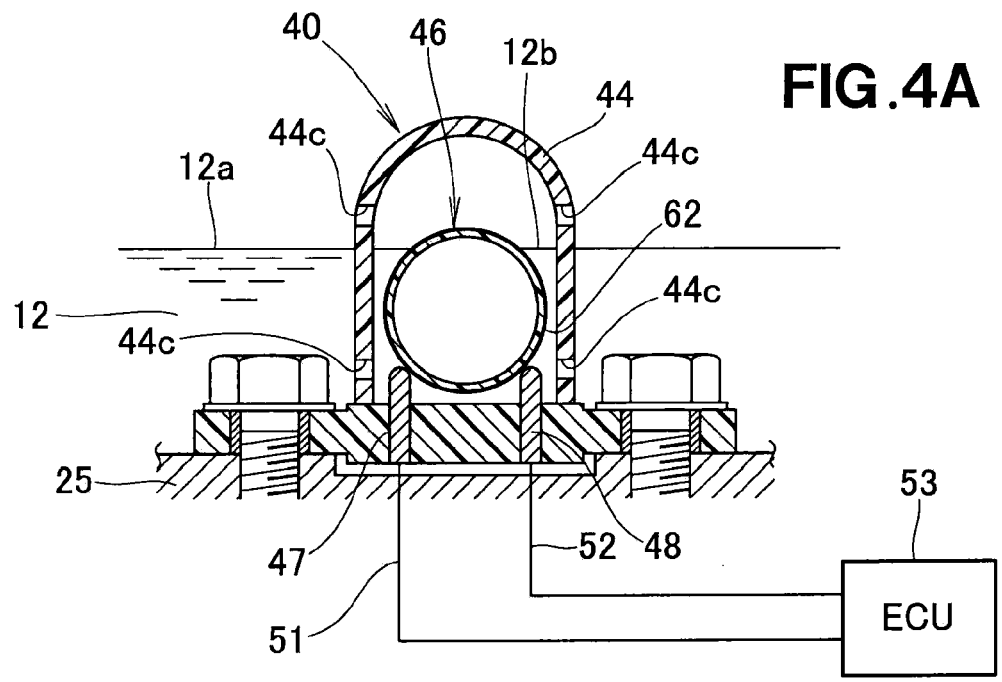
FIG. 4 is a view explanatory of behavior of the oil level detecting switch of the present invention.

Next, a description will be given about behavior of the oil level detecting switch 40 of the present invention. Once the oil level 12a descends to reaches the predetermined lower limit level due to decrease of the amount of the oil 12 from a sufficiently-stored state as shown in FIG. 4A, an oil level 12b within the switch case 44 too descends to the same height as the oil level 12a (outside the switch case 44) because the inside and outside of switch case 44 are in fluid communication with each other via the above-mentioned through-holes 44c.

Thus, the float 46 descends with the oil 12 so that the outer film 62 of the float 46 is brought into contact with the fixed contacts 47 and 48, and thus, the connection between the movable contact and the fixed contacts 47 and 48 is turned on. The electrical connection between the movable contact and the fixed contacts 47 and 48 is detected via the ECU 53, so that the ECU 53 issues an alarm and deactivates the engine.

In the instant embodiment of the invention, the outer film 62 of the float 46 and the fixed contact 47 can reliably contact and thus electrically connect with each other even when the outer film 62 and one of the contact members 47a of the contact 47 fail to electrically connect with each other, for example, due to some electrically insulating substance such as dust present between the float 46 and the contact member 47a, as long as the outer film 62 and the other contact member 47b contact each other.

Similarly, the outer film 62 of the float 46 and the fixed contact 48 can reliably contact and thus electrically connect with each other even when the outer film 62 and one of the contact members 48a of the contact 48 fail to electrically connect with each other, as long as the outer film 62 and the other contact member 48b contact.

Namely, with the two fixed contacts 47 and 48 each comprising a pair of contact members 47a, 47b or 48a, 48b, the oil level detecting switch 40 can operate with an enhanced reliability.

Figure 4B:
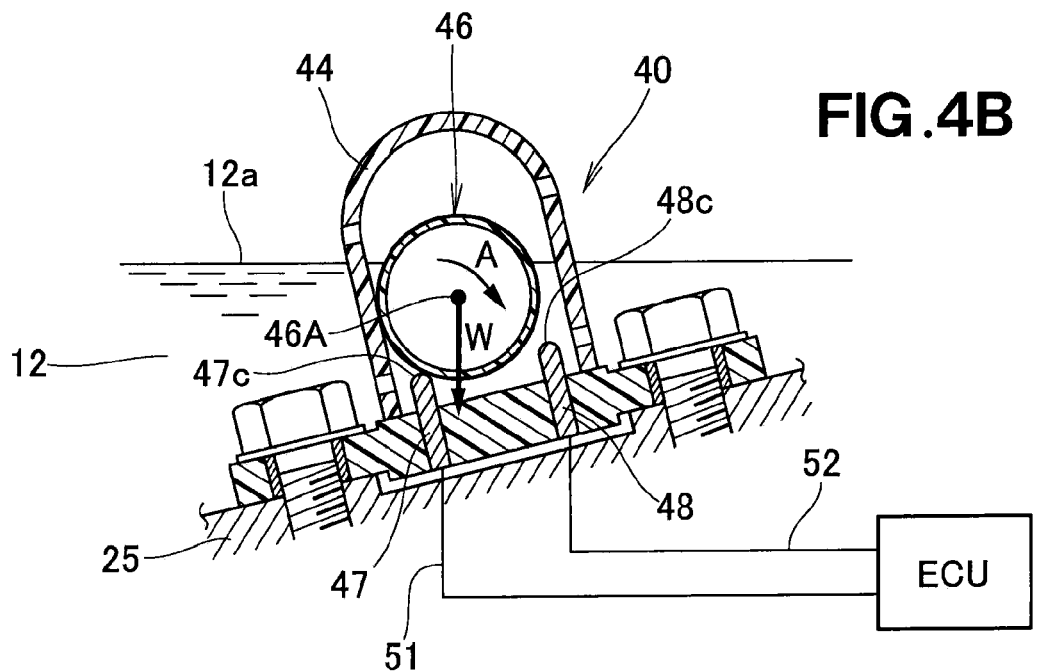

FIG. 4B shows the oil 12 having decreased with the engine in an inclined position. If the float 46 has been brought into contact with the inner surface of the switch case 44 while contacting one of the fixed contacts 47, for example, the float 46 rotates as indicated by arrow A to contact the two fixed contacts 47 and 48 by virtue of a weight W (with force of buoyancy taken away therefrom) acting on the center of gravity 46A of the float 46, because the center of gravity 46A is always located between the distal ends 47c and 48c of the fixed contacts 47 and 48 as long as the engine is inclined within its predetermined maximum inclination angle range.

As described above in relation to FIGS. 1 and 2, the oil pan 26 as an oil storing chamber is provided in a lower area within the crankcase 13 of the engine 10, and the oil level detecting switch 40 detects the amount of the lubricant oil 12 stored in the oil pan 26. The oil level detecting switch 40 includes the switch case 44 having the through-holes 44c that permits entry and discharge of the oil into and out of the switch case 44, the spherical float 46 having smaller specific gravity than the oil 12, having the electrically conductive outer surface 62 and vertically-movably provided within the switch case 44, and the fixed contacts 47 and 48 provided on the bottom surface of the switch case 44 and shiftable into the electrically conducting state by the float 46 contacting the contacts 47 and 48. Such arrangements can eliminate the need for a guide member for guiding the float 46, and thus, the oil level detecting switch 40 can be constructed in a reduced size. As a result, the oil level detecting switch 40 can be attached to the engine 10 with an increased ease.

Further, even when the engine 10 is in an inclined position, the above-described embodiment can avoid the prior art problem that the float and hence the oil level detecting switch malfunctions by the load of the float acting on a float guide to increase frictional force between the guide and the float oil level detecting switch. Furthermore, the above-described embodiment can avoid the problem that uneven abrasion is caused in the float guide due to vibration and long-time use of the engine 10 so that it becomes difficult for the float to move and thus the oil level detecting switch tends to malfunction. Because there is no undesired catching engagement between the float and the float guide as encountered in the prior art, the reliability of the oil level detecting switch 40 can be significantly improved.

Furthermore, the above-described embodiment, where there is provided no guide member for guiding the float 46 and the float 46 functions also as the movable contact, can reduce the numbers of necessary component parts and assembly steps and thereby reduce necessary cost.

Furthermore, in the above-described embodiment, the fixed contacts 47 and 48 comprise two pairs of electrically interconnected fixed contact members 47a, 47b and 48a, 48b, and the two pairs are capable of being placed in an electrically conducting state via the float 46. Thus, even when the float 46 and one of the contact members 47a of the contact 47 fail to electrically connect with each other, for example, the float 46 can electrically connect with the other contact member 47b of the contact 47, so that the oil level detecting switch 40 can reliably detect the oil level.

Whereas the float body 61 of the float 46 has been described above, in relation to FIG. 2, as made of resin and having the electrically conductive outer film 62 formed thereon, the present invention is not so limited, and the float 62 may be a spherical member formed of electrically conductive metal. What is important here is that the float 46 has an electrically conductive outer surface to function as the movable contact.

Further, in the embodiment of the oil level detecting switch 40, the switch case 44 is mounted on the base member 43 and the outwardly projecting flanges 43b of the base member 43 are attached to the second crankcase member 25, as described above in relation to FIG. 2. However, the present invention is not so limited, and an outwardly projecting flange may be formed on a lower end portion of the switch case 44 with a plurality of inwardly projecting fixed contacts provided on the lower end portion of the switch case 44 and the outwardly projecting flange may be attached to the second crankcase member 25.

The oil level detecting switch of the present invention is well suited for application to general-purpose engines.

Obviously, various minor changes and modifications of the present invention are possible in light of the above teaching. It is therefore to be understood that within the scope of the appended claims the invention may be practiced otherwise than as specifically described.

What is claimed is:

1. An oil level detecting switch for detecting an amount of lubricant oil stored in an oil storing chamber provided in a lower interior portion of a crankcase of an engine, comprising:
    a switch case having a through-hole to permit entry and discharge of oil into and out of the switch case, wherein the switch case is mounted to a base member which is adapted to be secured to the lower interior portion of the crankcase;
    a float of a spherical shape having smaller specific gravity than the oil and having an electrically conductive outer surface, the float being provided within the switch case for upward or downward movement in response to increase or decrease in a stored amount of the oil; and
    a plurality of fixed contacts provided on a bottom surface of the switch case in such a manner that the fixed contacts are placed in an electrically conducting state by the float contacting the fixed contacts, wherein the fixed contacts are secured to the base member to project upwardly from the upper surface of the base member.

2. The oil level detecting switch according to claim 1, wherein each of the fixed contacts comprises a pair of electrically interconnected fixed contact members, and respective ones of the pairs of the fixed contact members are adapted to be placed in an electrically conducting state via the float.

* * * * *